United States Patent
Stueven et al.

(10) Patent No.: US 8,389,658 B2
(45) Date of Patent: Mar. 5, 2013

(54) METHOD FOR PRODUCING POST-CURED WATER-ABSORBENT POLYMER PARTICLES WITH A HIGHER ABSORPTION BY POLYMERIZING DROPLETS OF A MONOMER SOLUTION

(75) Inventors: Uwe Stueven, Bad Soden (DE); Matthias Weismantel, Jossgrund-Oberndorf (DE); Wilfried Heide, Freinsheim (DE); Marco Krüger, Mannheim (DE); Volker Seidl, Mannheim (DE); Stefan Blei, Mannheim (DE); Dennis Lösch, Altrip (DE); Rüdiger Funk, Niedernhausen (DE); Annemarie Hillebrecht, Künzell (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/371,208

(22) Filed: Feb. 10, 2012

(65) Prior Publication Data

US 2012/0141792 A1    Jun. 7, 2012

Related U.S. Application Data

(62) Division of application No. 12/306,803, filed as application No. PCT/EP2007/056952 on Jul. 9, 2007, now Pat. No. 8,202,957.

(30) Foreign Application Priority Data

Jul. 19, 2006    (EP) .................................... 06117488

(51) Int. Cl.
*C08F 20/06* (2006.01)
(52) U.S. Cl. ................... 526/317.1; 525/329.7
(58) Field of Classification Search ............ 526/317.1; 525/329.7
See application file for complete search history.

(56) References Cited

U.S. PATENT DOCUMENTS

| | | | |
|---|---|---|---|
| 5,269,980 A | 12/1993 | Levendis et al. |
| 7,727,586 B2 | 6/2010 | Bruhns et al. |
| 8,003,728 B2 | 8/2011 | Riegel et al. |
| 2005/0245684 A1 | 11/2005 | Daniel et al. |
| 2006/0217508 A1 | 9/2006 | Schmid et al. |
| 2007/0100115 A1 | 5/2007 | Schmid et al. |
| 2007/0161759 A1 | 7/2007 | Riegel et al. |
| 2007/0244280 A1 | 10/2007 | Losch et al. |
| 2007/0293617 A1 | 12/2007 | Riegel et al. |
| 2008/0045624 A1 | 2/2008 | Losch et al. |
| 2008/0045625 A1 | 2/2008 | Losch et al. |
| 2008/0125533 A1 | 5/2008 | Riegel et al. |
| 2008/0194778 A1 | 8/2008 | Losch et al. |

FOREIGN PATENT DOCUMENTS

| | | |
|---|---|---|
| DE | 102 39 074 A1 | 3/2004 |
| DE | 103 14 466 A1 | 10/2004 |
| DE | 103 40 253 A1 | 3/2005 |
| DE | 10 2004 024 437 A1 | 12/2005 |
| DE | 10 2004 042 948 A1 | 3/2006 |
| DE | 10 2004 042 955 A1 | 3/2006 |
| DE | 10 2004 042946 A1 | 3/2006 |
| DE | 10 2004 057868 A1 | 6/2006 |
| DE | 10 2005 002412 A1 | 7/2006 |
| DE | 10 2005 019 398 A1 | 10/2006 |
| EP | 0 348 180 A2 | 12/1989 |
| WO | WO-96/40427 A1 | 12/1996 |
| WO | WO-2005/080479 A1 | 9/2005 |
| WO | WO-2006/042704 A2 | 4/2006 |

OTHER PUBLICATIONS

Buchholz et al., "Superabsorbent Polymer Technology" Wiley-VCH, 1998, S. 71-103.
International Search Report in PCT/EP2007/056952, dated Oct. 26, 2007.
Deutsche Anmeldung mit dem Aktenzeichen (translation: German application with reference number) 10 2006 001 596.7.

*Primary Examiner* — Vu A Nguyen
(74) *Attorney, Agent, or Firm* — Marshall, Gerstein & Borun LLP

(57) ABSTRACT

A process for preparing postcrosslinked water-absorbing polymer beads with high absorption by polymerizing droplets of a monomer solution in a gas phase surrounding the droplets, wherein the solids content of the monomer solution is at least 35% by weight and the polymer beads have a mean diameter of at least 150 μm.

8 Claims, No Drawings

METHOD FOR PRODUCING POST-CURED WATER-ABSORBENT POLYMER PARTICLES WITH A HIGHER ABSORPTION BY POLYMERIZING DROPLETS OF A MONOMER SOLUTION

CROSS-REFERENCE TO RELATED APPLICATIONS

This is a divisional of U.S. patent application Ser. No. 12/306,803, filed Dec. 29, 2008, which is the U.S. national phase of International Application No. PCT/EP2007/056952, filed Jul. 9, 2007, which claims the benefit of European Patent Application No. 06117488.4, filed Jul. 19, 2006.

The present invention relates to a process for preparing postcrosslinked water-absorbing polymer beads with high absorption by polymerizing droplets of a monomer solution in a gas phase surrounding the droplets, wherein the solids content of the monomer solution is at least 35% by weight and the polymer beads have a mean diameter of at least 150 μm.

The preparation of water-absorbing polymer beads is described in the monograph "Modern Superabsorbent Polymer Technology", F. L. Buchholz and A. T. Graham, Wiley-VCH, 1998, pages 71 to 103.

Being products which absorb aqueous solutions, water-absorbing polymers are used to produce diapers, tampons, sanitary napkins and other hygiene articles, but also as water-retaining agents in market gardening.

The properties of the water-absorbing polymers can be adjusted via the degree of crosslinking. With increasing crosslinking, the gel strength rises and the absorption capacity falls. This means that the centrifuge retention capacity (CRC) decreases with increasing absorbency under load (AUL) (at very high degrees of crosslinking, the absorbency under load also decreases again).

To improve the use properties, for example saline flow conductivity (SFC) in the swollen gel bed in the diaper and absorbency under load (AUL), water-absorbing polymer beads are generally postcrosslinked. This increases only the degree of crosslinking of the bead surface, which allows absorbency under load (AUL) and centrifuge retention capacity (CRC) to be decoupled at least partly. This postcrosslinking can be performed in aqueous gel phase. However, preference is given to coating ground and screened polymer beads (base polymer) with a postcrosslinker on the surface, thermally postcrosslinking them and drying them. Crosslinkers suitable for this purpose are compounds which comprise at least two groups which can form covalent bonds with the carboxylate groups of the hydrophilic polymer.

Spray polymerization combines the process steps of polymerization and drying. In addition, the particle size is set within certain limits by suitable process control.

The preparation of water-absorbing polymer beads by polymerizing droplets of a monomer solution is described, for example, in EP-A 0 348 180, WO 96/40427, U.S. Pat. No. 5,269,980, DE-A 103 14 466, DE-A 103 40 253 and DE-A 10 2004 024 437, and also the prior German applications 10 2005 002 412.2 and 10 2006 001 596.7. DE-A 10 2004 042 946, DE-A 10 2004 042 948 and DE-A 10 2004 042 955, and also the prior German application having the reference number 10 2005 019 398.6, describe the preparation of thickeners by spray polymerization.

It was an object of the present invention to provide a process for preparing water-absorbing polymer beads with an improved property profile, i.e. a high centrifuge retention capacity (CRC), a high absorbency under load (AUL) and a high free swell rate (FSR).

The object is achieved by a process process for preparing water-absorbing polymer beads by polymerizing droplets of a monomer solution comprising a) at least one ethylenically unsaturated monomer,
b) at least one crosslinker,
c) at least one initiator,
d) water, in a gas phase surrounding the droplets, the resulting polymer beads being postcrosslinked, wherein the solids content of the monomer solution is at least 35% by weight and the polymer beads have a mean diameter of at least 150 μm.

The water-absorbing polymer beads obtainable by the process according to the invention have a centrifuge retention capacity (CRC) of typically at least 20 g/g, preferably at least 25 g/g, preferentially at least 30 g/g, more preferably at least 35 g/g, most preferably at least 40 g/g. The centrifuge retention capacity (CRC) of the water-absorbing polymer beads is typically less than 60 g/g.

The absorbency under a load of 4.83 kPa (AUL0.7 psi) of the water-absorbing polymer beads obtainable by the process according to the invention fulfills the condition that $$\text{AUL}0.7 \text{ psi} \geq a\text{CRC}^2 + b\text{CRC} + c.$$

The coefficient a is −0.017, the coefficient b is +1.5 and the coefficient c is typically −6, preferably −5.5, more preferably −5, most preferably −4.5. The absorbency under a load of 4.83 kPa typically likewise fulfills the condition that $$a\text{CRC}^2 + b\text{CRC} \geq \text{AUL}0.7 \text{ psi} \geq a\text{CRC}^2 + b\text{CRC} + c.$$

The functional relationship applies for centrifuge retention capacities (CRCs) of from approx. 20 g/g to approx. 50 g/g.

The free swell rate (FSR) of the water-absorbing polymer beads obtainable by the process according to the invention fulfills the condition that $$\text{FSR} \geq a\text{CRC}^2 + b\text{CRC} + c.$$

The coefficient a is −0.00082, the coefficient b is +0.07 and the coefficient c is typically −0.95, preferably −0.9, more preferably −0.85, most preferably −0.8. The free swell rate (FSR) typically fulfills the condition that $$a\text{CRC}^2 + b\text{CRC} - 0.5 \geq \text{FSR} \geq a\text{CRC}^2 + b\text{CRC} + c.$$

The functional relationship applies for centrifuge retention capacities (CRCs) of from approx. 20 g/g to approx. 50 g/g.

The water-absorbing polymer beads obtainable by the process according to the invention have a permeability (SFC) of typically at least $2 \times 10^{-7}$ cm$^3$s/g, preferably at least $10 \times 10^{-7}$ cm$^3$s/g, preferably at least $30 \times 10^{-7}$ cm$^3$s/g, more preferably at least $60 \times 10^{-7}$ cm$^3$s/g, most preferably at least $200 \times 10^{-1}$ cm$^3$s/g. The permeability (SFC) of the water-absorbing polymer beads is typically less than $500 \times 10^{-7}$ cm$^3$s/g.

The solids content of the monomer solution is preferably at least 38% by weight, preferentially at least 40% by weight, more preferably at least 41% by weight, most preferably at least 42% by weight. The solids content is the sum of all constituents which are nonvolatile after the polymerization. These are monomer a), crosslinker b) and initiator c).

The property profile of the water-absorbing polymer beads improves with increasing solids content. The only upper limit in the solids content is the solubility.

The mean diameter of the polymer beads is preferably at least 200 μm, more preferably from 250 to 600 μm, very particularly from 300 to 500 μm, the bead diameter being determinable by light scattering and meaning the volume-average mean diameter. 90% of the polymer beads have a diameter of preferably from 100 to 800 μm, more preferably from 150 to 700 μm, most preferably from 200 to 600 μm.

The oxygen content of the gas phase is preferably from 0.001 to 0.15% by volume, more preferably from 0.002 to 0.1% by volume, most preferably from 0.005 to 0.05% by volume.

In addition to oxygen, the gas phase comprises preferably only inert gases, i.e. gases which do not intervene in the polymerization under reaction conditions, for example nitrogen and/or water vapor.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 50 g/100 g of water, and preferably have at least one acid group each.

Suitable monomers a) are, for example, ethylenically unsaturated carboxylic acids such as acrylic acid, methacrylic acid, maleic acid, fumaric acid and itaconic acid. Particularly preferred monomers are acrylic acid and methacrylic acid. Very particular preference is given to acrylic acid.

The preferred monomers a) have at least one acid group, the acid groups preferably having been at least partly neutralized.

The proportion of acrylic acid and/or salts thereof in the total amount of monomers a) is preferably at least 50 mol %, more preferably at least 90 mol % and most preferably at least 95 mol %.

The acid groups of the monomers a) have typically been neutralized partly, preferably to an extent of from 25 to 85 mol %, preferentially to an extent of from 50 to 80 mol %, more preferably to an extent of from 60 to 75 mol %, for which the customary neutralizing agents can be used, preferably alkali metal hydroxides, alkali metal oxides, alkali metal carbonates or alkali metal hydrogencarbonates, and mixtures thereof. Instead of alkali metal salts, it is also possible to use ammonium salts. Sodium and potassium are particularly preferred alkali metals, but very particular preference is given to sodium hydroxide, sodium carbonate or sodium hydrogencarbonate and mixtures thereof. Typically, the neutralization is achieved by mixing in the neutralizing agent as an aqueous solution, as a melt or else preferably as a solid. For example, sodium hydroxide may be present with a water content significantly below 50% by weight as a waxy mass with a melting point above 23° C. In this case, metering as piece material or a melt at elevated temperature is possible.

The monomers a), especially acrylic acid, comprise preferably up to 0.025% by weight of a hydroquinone monoether. Preferred hydroquinone monoethers are hydroquinone monomethyl ether (MEHQ) and/or tocopherols.

Tocopherol is understood to mean compounds of the following formula

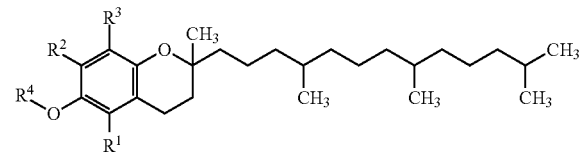

where $R^1$ is hydrogen or methyl. $R^2$ is hydrogen or, methyl, $R^3$ is hydrogen or methyl, and $R^4$ is hydrogen or an acyl radical having from 1 to 20 carbon atoms.

Preferred radicals for $R^4$ are acetyl, ascorbyl, succinyl, nicotinyl and other physiologically compatible carboxylic acids. The carboxylic acids may be mono-, di- or tricarboxylic acids.

Preference is given to alpha-tocopherol where $R^1=R^2=R^3$=methyl, in particular racemic alpha-tocopherol. $R^1$ is more preferably hydrogen or acetyl. RRR-alpha-tocopherol is especially preferred.

The monomer solution comprises preferably at most 130 ppm by weight, more preferably at most 70 ppm by weight, preferably at least 10 ppm by weight, more preferably at least 30 ppm by weight, in particular around 50 ppm by weight, of hydroquinone monoether, based in each case on acrylic acid, acrylic acid salts also being considered as acrylic acid. For example, the monomer solution can be prepared by using acrylic acid having an appropriate content of hydroquinone monoether.

The crosslinkers b) are compounds having at least two free-radically polymerizable groups which can be polymerized by a free-radical mechanism into the polymer network. Suitable crosslinkers b) are, for example, ethylene glycol dimethacrylate, diethylene glycol diacrylate, allyl methacrylate, trimethylolpropane triacrylate, triallylamine, tetraallyloxyethane, as described in EP-A-0 530 438, di- and triacrylates, as described in EP-A-0547 847, EP-A-0 559 476, EP-A-0 632 068, WO 93/21237, WO 03/104299, WO 03/104300, WO 03/104301 and in DE-A-103 31 450, mixed acrylates which, as well as acrylate groups, comprise further ethylenically unsaturated groups, as described in DE-A-103 314 56 and DE-A 103 55 401, or crosslinker mixtures, as described, for example, in DE-A-195 43 368, DE-A-196 46 484, WO 90/15830 and WO 02/32962.

Suitable crosslinkers b) are in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate or ethylene glycol dimethacrylate, and also trimethylolpropane triacrylate and allyl compounds such as allyl (meth)acrylate, triallyl cyanurate, diallyl maleate, polyallyl esters, tetraallyloxyethane, triallylamine, tetraallylethylenediamine, allyl esters of phosphoric acid and vinylphosphonic acid derivatives, as described, for example, in EP-A-0 343 427. Further suitable crosslinkers b) are pentaerythritol diallyl ether, pentaerythritol triallyl ether and pentaerythritol tetraallyl ether, polyethylene glycol diallyl ether, ethylene glycol diallyl ether, glycerol diallyl ether and glycerol triallyl ether, polyallyl ethers based on sorbitol, and ethoxylated variants thereof. In the process according to the invention, it is possible to use di(meth)acrylates of polyethylene glycols, the polyethylene glycol used having a molecular weight between 300 and 1000.

However, particularly advantageous crosslinkers b) are di- and triacrylates of 3- to 15-tuply ethoxylated glycerol, of 3- to 15-tuply ethoxylated trimethylolpropane, of 3- to 15-tuply ethoxylated trimethylolethane, in particular di- and triacrylates of 2- to 6-tuply ethoxylated glycerol or of 2- to 6-tuply ethoxylated trimethylolpropane, of 3-tuply propoxylated glycerol or of 3-tuply propoxylated trimethylolpropane, and also of 3-tuply mixed ethoxylated or propoxylated glycerol or of 3-tuply mixed ethoxylated or propoxylated trimethylolpropane, of 15-tuply ethoxylated glycerol or of 15-tuply ethoxylated trimethylolpropane, and also of 40-tuply ethoxylated glycerol, of 40-tuply ethoxylated trimethylolethane or of 40-tuply ethoxylated trimethylolpropane.

Very particularly preferred crosslinkers b) are the polyethoxylated and/or -propoxylated glycerols which have been esterified with acrylic acid or methacrylic acid to give di- or triacrylates, as described, for example in WO 03/104301. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol. These feature particularly low residual contents (typically below 10 ppm) in the water-absorbing polymer, and the aqueous extracts of the water-absorbing polymers thus produced have an almost unchanged surface tension (typically at least 0.068 N/m) in comparison to water at the same temperature.

The monomer solution comprises typically at least 0.4% by weight, preferably at least 0.6% by weight, preferentially at least 0.8% by weight, more preferably at least 1.5% by weight and most preferably at least 3.0% by weight, of crosslinker b), based in each case on monomer a).

The initiators c) used may be all compounds which disintegrate into free radicals under the polymerization conditions, for example peroxides, hydroperoxides, hydrogen peroxide, persulfates, azo compounds and redox initiators. Preference is given to the use of water-soluble initiators. In some cases, it is advantageous to use mixtures of various initiators, for example mixtures of hydrogen peroxide and sodium or potassium peroxodisulfate. Mixtures of hydrogen peroxide and sodium peroxodisulfate can be used in any proportion.

Particularly preferred initiators c) are azo initiators such as 2,2'-azobis[2-(2-imidazolin-2-yl)propane]dihydrochloride and 2,2'-azobis[2-(5-methyl-2-imidazolin-2-yl)propane]dihydrochloride, and photoinitiators such as 2-hydroxy-2-methylpropiophenone and 1-[4-(2-hydroxyethoxy)phenyl]-2-hydroxy-2-methyl-1-propan-1-one, redox initiators such as sodium persulfate/hydroxymethylsulfinic acid, ammonium peroxodisulfate/hydroxymethylsulfinic acid, hydrogen peroxide/hydroxymethylsulfinic acid, sodium persulfate/ascorbic acid, ammonium peroxodisulfate/ascorbic acid and hydrogen peroxide/ascorbic acid, photoinitiators such as 1-[4-(2-hydroxyethoxy)phenyl]-2-hydroxy-2-methyl-1-propan-1-one, and mixtures thereof.

The initiators are used in customary amounts, for example in amounts of from 0.001 to 5% by weight, preferably from 0.01 to 1% by weight, based on the monomers a).

For optimal action, the preferred polymerization inhibitors require dissolved oxygen. Therefore, the monomer solution can be freed of dissolved oxygen before the polymerization by inertization, i.e. flowing through with an inert gas, preferably nitrogen. The oxygen content of the monomer solution is preferably lowered before the polymerization to less than 1 ppm by weight, more preferably to less than 0.5 ppm by weight.

The polymerization inhibitors can also be removed by absorption, for example on activated carbon.

For the polymerization in the gas phase, the monomer solution can be dropletized.

The polymerization in the monomer solution droplets preferably takes place in homogeneous phase. This means that the monomer solution is homogeneous and that the monomer solution remains homogeneous even during the polymerization. The polymer may swell during the polymerization but should not precipitate out and form a second phase in the droplet. Otherwise, several polymer nuclei would form in each droplet and form agglomerates of very small primary particles during the drying. The aim of the process according to the invention is preferably the production of one primary particle each per droplet. The monomers a) and the crosslinkers b) should therefore be selected such that the resulting polymer is swellable in the aqueous phase of the droplet.

The process according to the invention is preferably performed in the absence of hydrophobic inert solvents. Hydrophobic inert solvents are virtually all water-immiscible liquids which do not intervene in the polymerization, i.e. comprise no polymerizable groups. Water-immiscible means that the solubility of the hydrophobic solvents in water is less than 5 g/100 g, preferably less than 1 g/100 g, more preferably less than 0.5 g/100 g.

The dropletization involves metering a monomer solution into the gas phase to form droplets. The dropletization of the monomer solution can be carried out, for example, by means of a dropletizer plate.

A dropletizer plate is a plate having at least one bore, the liquid entering the bore from the top. The dropletizer plate or the liquid can be oscillated, which generates a chain of ideally monodisperse droplets at each bore on the underside of the dropletizer plate.

The number and size of the bores is selected according to the desired capacity and droplet size. The droplet diameter is typically 1.9 times the diameter of the bore. What is important here is that the liquid to be dropletized does not pass through the bore too rapidly and the pressure drop over the bore is not too great. Otherwise, the liquid is not dropletized, but rather the liquid jet is broken up (sprayed) owing to the high kinetic energy. The dropletizer is operated in the flow range of laminar jet decomposition, i.e. the Reynolds number based on the throughput per bore and the bore diameter is preferably less than 2000, preferentially less than 1000, more preferably less than 500 and most preferably less than 100. The pressure drop over the bore is preferably less than 2.5 bar, more preferably less than 1.5 bar and most preferably less than 1 bar.

The dropletizer plate has typically at least one bore, preferably at least 10, more preferably at least 50 and typically up to 10 000 bores, preferably up to 5000, more preferably up to 1000 bores, the bores typically being distributed uniformly over the dropletizer plate, preferably in so-called triangular pitch, i.e. three bores in each case form the corners of an equilateral triangle.

The diameter of the bores is adjusted to the desired droplet size.

It may be advantageous to place the dropletizer plate onto a carrier plate, the carrier plate likewise having bores. In this case, the bores of the carrier plate have a greater diameter than the bores of the dropletizer plate and are arranged such that below each bore of the dropletizer plate is disposed a concentric bore of the carrier plate. This arrangement enables a rapid exchange of the dropletizer plate, for example in order to generate droplets of another size.

However, the dropletization can also be carried out by means of pneumatic drawing dies, rotation, cutting of a jet or rapidly actuable microvalve dies.

In a pneumatic drawing die, a liquid jet together with a gas stream is accelerated through a hole diaphragm. The gas rate can be used to influence the diameter of the liquid jet and hence the droplet diameter.

In the case of dropletization by rotation, the liquid passes through the orifices of a rotating disk. As a result of the centrifugal force acting on the liquid, droplets of defined size are torn off. Rotary dropletization is described, for example, in DE-A 4308842 and U.S. Pat. No. 6,338,438.

The emerging liquid jet can also be cut into defined segments by means of a rotating blade. Each segment then forms a droplet.

In the case of use of microvalve dies, droplets with defined liquid volume are generated directly.

The gas phase preferably flows as carrier gas through the reaction chamber. The carrier gas can be conducted through the reaction chamber in cocurrent or in countercurrent to the free-falling droplets of the monomer solution, preferably in cocurrent. After one pass, the carrier gas is preferably recycled at least partly, preferably to an extent of at least 50%, more preferably to an extent of at least 75%, into the reaction chamber as cycle gas. Typically, a portion of the carrier gas is discharged after each pass, preferably up to 10%, more preferably up to 3% and most preferably up to 1%.

The polymerization is preferably carried out in a laminar gas flow. A laminar gas flow is a gas flow in which the individual layers of the flow do not mix but rather move in parallel. A measure of the flow conditions is the Reynolds number (Re). Below a critical Reynolds number ($Re_{crit}$) of 2300, the gas flow is laminar. The Reynolds number of the laminar gas flow is preferably less than 2000, more preferably less than 1500 and most preferably less than 1000. The lower limiting case of the laminar inert gas flow is a standing inert gas atmosphere (Re=0), i.e. inert gas is not fed in continuously.

The gas velocity is preferably adjusted such that the flow in the reactor is directed, for example no convection currents opposed to the general flow direction are present, and is, for example, from 0.1 to 2 m/s, preferably from 0.5 to 1.8 m/s, preferably from 1 to 1.5 m/s.

The carrier gas is appropriately preheated to the reaction temperature upstream of the reactor.

The reaction temperature in the thermally induced polymerization is preferably from 70 to 250° C., more preferably from 100 to 220° C. and most preferably from 120 to 200° C.

The reaction can be carried out under elevated pressure or under reduced pressure; preference is given to a reduced pressure of up to 100 mbar relative to ambient pressure.

The reaction offgas, i.e. the carrier gas leaving the reaction chamber, may, for example, be cooled in a heat exchanger. This condenses water and unconverted monomer a). The reaction offgas can then be reheated at least partly and recycled into the reactor as cycle gas. A portion of the reaction offgas can be discharged and replaced by fresh carrier gas, in which case water and unconverted monomers a) present in the reaction offgas can be removed and recycled.

Particular preference is given to a thermally integrated system, i.e. a portion of the waste heat in the cooling of the offgas is used to heat the cycle gas.

The reactors can be trace-heated. In this case, the trace heating is adjusted such that the wall temperature is at least 5° C. above the internal reactor temperature and condensation on the reactor walls is reliably prevented.

The reaction product can be withdrawn from the reactor in a customary manner, for example at the bottom by means of a conveying screw, and, if appropriate, dried down to the desired residual moisture content and to the desired residual monomer content.

The polymer beads are subsequently postcrosslinked for further improvement of the properties.

Suitable postcrosslinkers are compounds which comprise at least two groups which can form covalent bonds with the carboxylate groups of the hydrogel. Suitable compounds are, for example, alkoxysilyl compounds, polyaziridines, polyamines, polyamidoamines, di- or polyglycidyl compounds, as described in EP-A-0 083 022, EP-A-0 543 303 and EP-A-0 937 736, di- or polyfunctional alcohols as described in DE-C-33 14 019, DE-C-35 23 617 and EP-A-0 450 922, or β-hydroxyalkylamides, as described in DE-A-102 04 938 and U.S. Pat. No. 6,239,230.

In addition, DE-A-40 20 780 describes cyclic carbonates, DE-A-198 07 502 describes 2-oxazolidone and its derivatives such as 2-hydroxyethyl-2-oxazolidone, DE-A-198 07 992 describes bis- and poly-2-oxazolidinones, DE-A-198 54 573 describes 2-oxotetrahydro-1,3-oxazine and its derivatives, DE-A-198 54 574 describes N-acyl-2-oxazolidones, DE-A-102 04 937 describes cyclic ureas, DE-A-103 34 584 describes bicyclic amide acetals. EP-A-1 199 327 describes oxetanes and cyclic ureas, and WO 03/031482 describes morpholine-2,3-dione and its derivatives, as suitable postcrosslinkers.

The amount of postcrosslinker is preferably from 0.01 to 1% by weight, more preferably from 0.05 to 0.5% by weight, most preferably from 0.1 to 0.2% by weight, based in each case on the polymer.

The postcrosslinking is typically carried out in such a way that a solution of the postcrosslinker is sprayed onto the hydrogel or the dry polymer beads. The spray application is followed by thermal drying, and the postcrosslinking reaction may take place either before or during drying.

The spray application of a solution of the crosslinker is preferably carried out in mixers with moving mixing tools, such as screw mixers, paddle mixers, disk mixers, plowshare mixers and shovel mixers. Particular preference is given to vertical mixers, very particular preference to plowshare mixers and shovel mixers. Suitable mixers are, for example, Lödige® mixers, Bepex® mixers, Nauta® mixers, Processall® mixers and Schugi® mixers.

The thermal drying is preferably carried out in contact dryers, more preferably shovel dryers, most preferably disk dryers. Suitable dryers are, for example, Bepex® dryers and Nara® dryers. Moreover, it is also possible to use fluidized bed dryers.

The drying can be effected in the mixer itself, by heating the jacket or blowing in warm air. Equally suitable is a downstream dryer, for example a tray dryer, a rotary tube oven or a heatable screw. It is particularly advantageous to mix and to dry in a fluidized bed dryer.

Preferred drying temperatures are in the range from 170 to 250° C., preferably from 180 to 220° C., and more preferably from 190 to 210° C. The preferred residence time at this temperature in the reaction mixer or dryer is preferably at least 10 minutes, more preferably at least 20 minutes, most preferably at least 30 minutes.

The process according to the invention enables the preparation of water-absorbing polymer beads with a high centrifuge retention capacity (CRC) and a high absorbency under a load of 4.83 kPa (AUL0.7 psi).

The present invention further provides water-absorbing polymer beads which are obtainable by the process according to the invention.

The inventive water-absorbing polymer beads have a content of hydrophobic solvent of typically less than 0.005% by weight, preferably less than 0.002% by weight, more preferably less than 0.001% by weight and most preferably less than 0.0005% by weight. The content of hydrophobic solvent can be determined by gas chromatography, for example by means of the headspace technique.

Polymer beads which have been obtained by reverse suspension polymerization still comprise typically approx. 0.01% by weight of the hydrophobic solvent used as the reaction medium.

The inventive water-absorbing polymer beads have a surfactant content of typically less than 1% by weight, preferably less than 0.5% by weight, more preferably less than 0.1% by weight and most preferably less than 0.05% by weight.

Polymer beads which have been obtained by reverse suspension polymerization still comprise typically at least 1% by weight of the surfactant used to stabilize the suspension.

The inventive water-absorbing polymer beads are approximately round, i.e. the polymer beads have a mean sphericity of typically at least 0.84, preferably at least 0.86, more preferably at least 0.88 and most preferably at least 0.9. The sphericity (SPHT) is defined as $$SPHT = \frac{4\pi A}{U^2},$$

where A is the cross-sectional area and U is the cross-sectional circumference of the polymer beads. The mean sphericity is the volume-average sphericity.

The mean sphericity can be determined, for example, with the Camsizer® image analysis system (Retsch Technolgy GmbH; Germany):

For the measurement, the product is introduced through a funnel and conveyed to the falling shaft with a metering channel. While the particles fall past a light wall, they are recorded selectively by a camera. The images recorded are evaluated by the software in accordance with the parameters selected.

To characterize the roundness, the parameters designated as sphericity in the program are employed. The parameters reported are the mean volume-weighted sphericities, the volume of the particles being determined via the equivalent diameter $xc_{min}$. To determine the equivalent diameter $xc_{min}$, the longest chord diameter for a total of 32 different spatial directions is measured in each case. The equivalent diameter $xc_{min}$ is the shortest of these 32 chord diameters. The equivalent diameter $xc_{min}$ corresponds to the mesh size of a screen that the particle can just pass through. To record the particles, the so-called CCD-zoom camera (CAM-Z) is used. To control the metering channel, a surface coverage fraction of 0.5% is predefined.

Polymer beads with relatively low sphericity are obtained by reverse suspension polymerization when the polymer beads are agglomerated during or after the polymerization.

The water-absorbing polymer beads prepared by customary solution polymerization (gel polymerization) are ground and classified after drying to obtain irregular polymer beads. The mean sphericity of these polymer beads is between approx. 0.72 and approx. 0.78.

The present invention further provides processes for producing hygiene articles, in particular diapers, comprising the use of water-absorbing polymer beads prepared by the above-mentioned process.

The present invention further provides for the use of inventive water-absorbing polymer beads in hygiene articles, for thickening wastes, in particular medical wastes, or as water-retaining agents in market gardening.

The water-absorbing polymer beads are tested by means of the test methods described below.

Methods:

The measurements should, unless stated otherwise, be carried out at an ambient temperature of 23±2° C. and a relative atmospheric humidity of 50±10%. The water-absorbing polymers are mixed thoroughly before the measurement.

Saline Flow Conductivity (SFC)

The saline flow conductivity of a swollen gel layer under pressure load of 0.3 psi (2070 Pa) is, as described in EP-A-0 640 330, determined as the gel layer permeability of a swollen gel layer of superabsorbent polymer, although the apparatus described on page 19 and in FIG. 8 in the aforementioned patent application was modified to the effect that the glass frit (40) is no longer used, the plunger (39) consists of the same polymer material as the cylinder (37) and now comprises 21 bores of equal size distributed uniformly over the entire contact surface. The procedure and the evaluation of the measurement remains unchanged from EP-A-0 640 330. The flow rate is recorded automatically.

The saline flow conductivity (SFC) is calculated as follows:

SFC [$cm^3 s/g$]=$(Fg(t=0) \times L0)/(d \times A \times WP)$, where $Fg(t=0)$ is the flow rate of NaCl solution in g/s, which is obtained by means of a linear regression analysis of the $Fg(t)$ data of the flow determinations by extrapolation to t=0, L0 is the thickness of the gel layer in cm, d is the density of the NaCl solution in $g/cm^3$, A is the surface area of the gel layer in $cm^2$ and WP is the hydrostatic pressure over the gel layer in $dyn/cm^2$.

Free Swell Rate (FSR)

To determine the free swell rate, 1.00 g (=$W_1$) of the dry water-absorbing polymer beads are weighed into a 25 ml beaker and distributed uniformly over its base. 20 ml of a 0.9% by weight sodium chloride solution were then metered by means of into a second beaker and the contents of this beaker were added rapidly to the first and a stopwatch was started. As soon as the last drop of salt solution had been absorbed, which is recognized by the disappearance of the reflection on the liquid surface, the stopwatch was stopped. The precise amount of liquid which had been poured out of the second beaker and absorbed by the polymer in the first beaker was determined precisely by reweighing the second beaker (=$W_2$). The period required for the absorption, which was measured with the stopwatch, was referred to as t. The disappearance of the last liquid drop on the surface was determined as the time t.

The free swell rate (FSR) is calculated therefrom as follows:

FSR [g/gs]=$W_2/(W_1 \times t)$

Centrifuge Retention Capacity (CRC)

The centrifuge retention capacity of the water-absorbing polymer beads is determined by the EDANA (European Disposables and Nonwovens Association) recommended test method No. 441.2-02 "Centrifuge Retention Capacity".

Absorbency Under Load (AUL0.7 psi Absorbency Under Load)

The absorbency under load is determined by the EDANA (European Disposables and Nonwovens Association) recommended test method No. 442.2-02 "Absorption under pressure".

The EDANA test methods are obtainable, for example, from the European Disposables and Nonwovens Association, Avenue Eugène Plasky 157, B-1030 Brussels, Belgium.

EXAMPLES

Examples 1 to 7

14.6 kg of sodium acrylate (37.5% by weight solution in water) and 1.4 kg of acrylic acid were mixed with 11.2 g to 168 g of 15-tuply ethoxylated trimethylolpropane triacrylate. The solution was dropletized into a heated dropletization tower filled with nitrogen atmosphere (180° C., height 12 m, width 2 m, gas velocity 0.1 m/s in cocurrent). The metering rate was 16 kg/h. The dropletizer plate had 37 bores of 170 μm. The diameter of the dropletizer plate was 65 mm. The initiator was metered into the monomer solution via a Venturi mixer just upstream of the dropletizer. The initiator used was a 15% by weight solution of 2,2'-azobis[2-(2-imidazolin-2-yl)propane]dihydrochloride in water. The metering rate of the initiator solution was 0.224 kg/h. The gas exit temperature from the dropletization tower was 130° C. The mean particle diameter of the resulting polymer beads was 270 μm.

The resulting water-absorbing polymer beads were then postcrosslinked. To this end, 20 g of water-absorbing polymer beads were sprayed with a postcrosslinker solution by means of an injection syringe in a Waring® laboratory mixer at medium stirrer speed. The moist polymer was homogenized once again with a spatula, distributed uniformly in a Petri dish with an internal diameter of 18.5 cm and heat-treated in a forced-air drying cabinet. The postcrosslinked polymer beads were freed of lumps by means of a 600 μm sieve and analyzed.

Postcrosslinking A: The postcrosslinker solution consisted of 0.016 g of diethylene glycol diglycidyl ether, 0.35 g of water and 0.234 g of propylene glycol. The moist polymer was heat-treated in a forced-air drying cabinet at 120° C. for 30 minutes.

Postcrosslinking B: The postcrosslinker solution consisted of 0.03 g of N-hydroxyethyloxazolidin-2-one, 0.42 g of water and 0.18 g of isopropanol. The moist polymer was heat-treated in a forced-air drying cabinet at 170° C. for 60 minutes.

The results are summarized in Tables 1 and 2:

TABLE 1

Postcrosslinking with diethylene glycol diglycidyl ether (postcrosslinking A)

| Ex. | Crosslinker content*) | CRC [g/g] | AUL0.7 psi [g/g] | SFC [$10^{-7}$ cm$^3$s/g] | FSR [g/gs] |
|---|---|---|---|---|---|
| 1 | 0.2% by wt. | 41.9 | 28.3 | 2 | 0.75 |
| 2 | 0.3% by wt. | 37.2 | 28.1 | 10 | 0.59 |
| 3 | 0.4% by wt. | 34.8 | 27.2 | 16 | 0.58 |
| 4 | 0.6% by wt. | 31.2 | 25.6 | 36 | 0.65 |
| 5 | 0.8% by wt. | 28.7 | 24.5 | 51 | 0.51 |
| 6 | 1.5% by wt. | 26.4 | 22.3 | 76 | 0.53 |
| 7 | 3.0% by wt. | 23.1 | 21.4 | 203 | 0.30 |

| Ex. | AUL0.7 psi [g/g] | $-0.017\ CRC^2 + 1.5\ CRC-6$ [g/g] | FSR [g/gs] | $-0.00082\ CRC^2 + 0.07\ CRC-0.95$ [g/g] |
|---|---|---|---|---|
| 1 | 28.3 | 27.0 | 0.75 | 0.54 |
| 2 | 28.1 | 26.3 | 0.59 | 0.52 |
| 3 | 27.2 | 25.6 | 0.58 | 0.49 |
| 4 | 25.6 | 24.3 | 0.65 | 0.42 |
| 5 | 24.5 | 23.0 | 0.51 | 0.38 |
| 6 | 22.3 | 21.8 | 0.53 | 0.33 |
| 7 | 21.4 | 19.6 | 0.30 | 0.23 |

*) based on acrylic acid

TABLE 2

Postcrosslinking with N-hydroxyethyloxazolidin-2-one (postcrosslinking B)

| Ex. | Crosslinker content*) | CRC [g/g] | AUL0.7 psi [g/g] | SFC [$10^{-7}$ cm$^3$s/g] | FSR [g/gs] |
|---|---|---|---|---|---|
| 1 | 0.2% by wt. | 41.7 | 28.1 | 3 | 0.63 |
| 2 | 0.3% by wt. | 39.6 | 29.0 | 3 | 0.70 |
| 3 | 0.4% by wt. | 35.7 | 29.1 | 10 | 0.59 |
| 4 | 0.6% by wt. | 32.6 | 25.0 | 25 | 0.61 |
| 5 | 0.8% by wt. | 30.2 | 27.1 | 37 | 0.42 |
| 6 | 1.5% by wt. | 27.7 | 23.4 | 65 | 0.60 |
| 7 | 3.0% by wt. | 22.9 | 21.6 | 216 | 0.31 |

| Ex. | AUL0.7 psi [g/g] | $-0.017\ CRC^2 + 1.5\ CRC-6$ [g/g] | FSR [g/gs] | $-0.00082\ CRC^2 + 0.07\ CRC-0.95$ [g/g] |
|---|---|---|---|---|
| 1 | 28.1 | 27.0 | 0.63 | 0.54 |
| 2 | 29.0 | 26.7 | 0.70 | 0.54 |
| 3 | 29.1 | 25.9 | 0.59 | 0.50 |
| 4 | 25.0 | 24.8 | 0.61 | 0.46 |
| 5 | 27.1 | 23.8 | 0.42 | 0.42 |
| 6 | 23.4 | 22.5 | 0.60 | 0.36 |
| 7 | 21.6 | 19.4 | 0.31 | 0.22 |

*) based on acrylic acid

Example 8

14.6 g of potassium acrylate (45.0% by weight solution in water) and 1.4 kg of acrylic acid were mixed with 17.1 g of 15-tuply ethoxylated trimethylolpropane triacrylate. The solution was dropletized in a heated dropletization tower filled with nitrogen atmosphere (180° C., height 12 m, width 2 m, gas velocity 0.1 m/s in cocurrent). The metering rate was 16 kg/h. The dropletizer plate had 37 bores of 170 μm. The diameter of the dropletizer plate was 65 mm. The initiator was metered into the monomer solution via a Venturi mixer just upstream of the dropletizer. The initiator used was a 15% by weight solution of 2,2'-azobis[2-(2-imidazolin-2-yl)propane] dihydrochloride in water. The metering rate of the initiator solution was 0.224 kg/h. The gas exit temperature from the dropletization tower was 130° C. The mean particle diameter of the resulting polymer beads was 270 μm. The resulting water-absorbing polymer beads were then postcrosslinked.

Postcrosslinking A: The resulting polymer beads had a CRC of 35.1 g/g, an AUL0.7 psi of 27.6 g/g and an SFC of $17 \times 10^{-7}$ cm$^3$g/s. The value of $-0.017$ CRC$^2$+1.5 CRC-6 was 25.7 g/g.

Postcrosslinking B: The resulting polymer beads had a CRC of 36.0 g/g, an AUL0.7 psi of 29.5 g/g and an SFC of $11 \times 10^{-7}$ cm$^3$ g/s. The value of $-0.017$ CRC$^2$+1.5 CRC-6 was 26.0 g/g.

Comparative Example

For comparison, commercial water-absorbing postcrosslinked polymer beads (Hysorb® M 7055, BASF Aktiengesellschaft, Germany) were tested.

The polymer beads had a CRC of 31.1 g/g, an AUL0.7 psi of 22.1 g/g, an SFC of $31 \times 10^{-7}$ cm$^3$ g/s and an FSR of 0.24 g/gs. The value of $-0.017$ CRC$^2$+1.5 CRC-6 was 24.2 g/g. The value of $-0.00082$ CRC$^2$+0.07 CRC-0.95 was 0.43 g/gs.

The invention claimed is:

1. Water-absorbing polymer beads having a mean sphericity of at least 0.84 and a content of hydrophobic solvents of less than 0.005% by weight, a centrifuge retention capacity (CRC) of at least 20 g/g, and an absorbency under a load of 4.83 kPa (AUL0.7 psi), which fulfill a condition that $$\text{AUL0.7 psi} \geq -0.017 \text{ CRC}^2 + 1.5 \text{ CRC} - 6.$$

2. Polymer beads according to claim 1, having a permeability of at least $2 \times 10^{-7}$ cm$^3$ s/g.

3. Polymer beads according to claim 1, having a mean diameter of at least 200 μm.

4. Polymer beads according to claim 1, wherein at least 90%, by weight, of the polymer beads have a diameter of from 100 to 800 μm.

5. Polymer beads according to claim 1, comprising at least partly of polymerized ethylenically unsaturated acid-bearing monomers.

6. Polymer beads according to claim 5, wherein the acid groups of the polymerized ethylenically unsaturated monomer have been at least partly neutralized.

7. Polymer beads according to claim 6, wherein the ethylenically unsaturated monomer is at least 50 mol % acrylic acid.

8. A hygiene article comprising polymer beads according to claim 1.

* * * * *